Sept. 3, 1940.   D. A. ELLIOTT   2,213,307
APPARATUS FOR DEFLECTING LIGHT
Filed June 26, 1937   4 Sheets-Sheet 1

DOUGLAS A. ELLIOTT, INVENTOR.

BY
ATTORNEY.

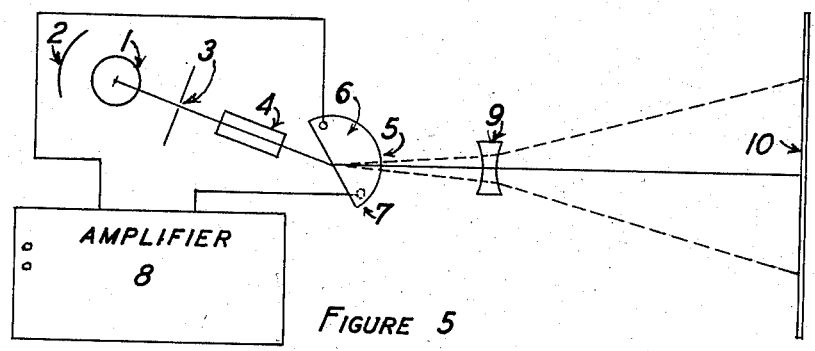
FIGURE 5
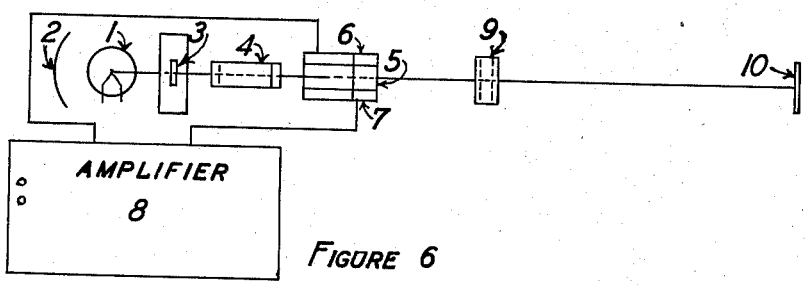
FIGURE 6
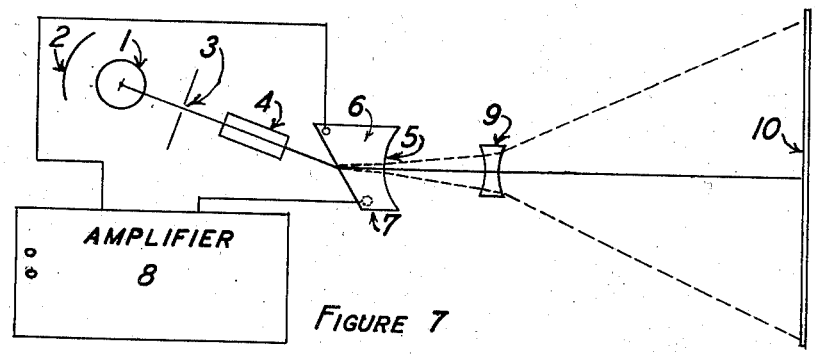
FIGURE 7
DOUGLAS A. ELLIOTT, INVENTOR.
ATTORNEY.

Sept. 3, 1940.    D. A. ELLIOTT    2,213,307
APPARATUS FOR DEFLECTING LIGHT
Filed June 26, 1937    4 Sheets-Sheet 3
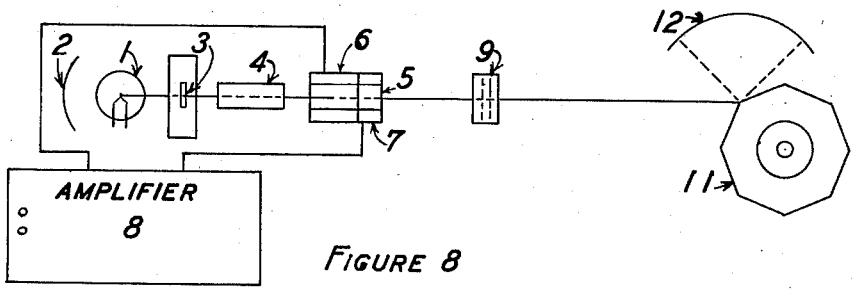
FIGURE 8
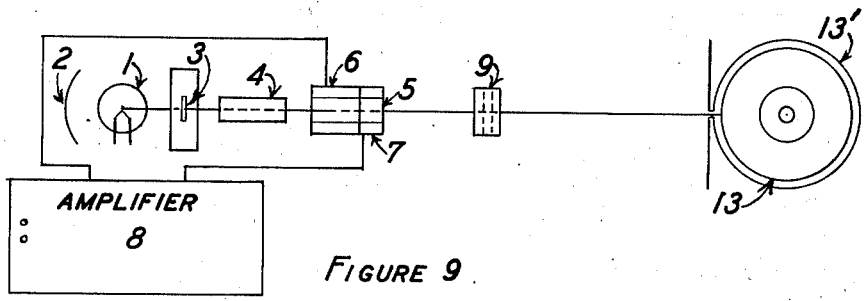
FIGURE 9
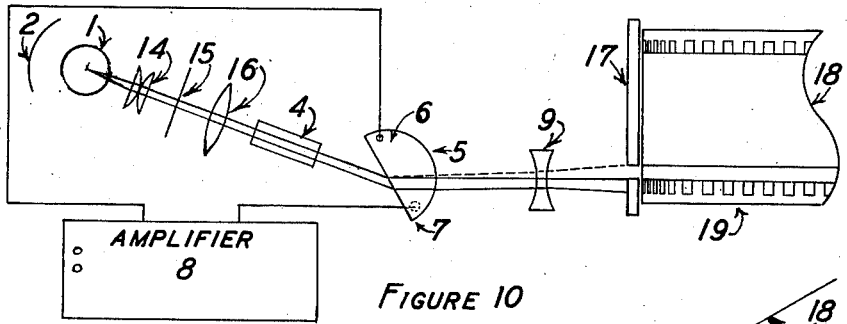
FIGURE 10
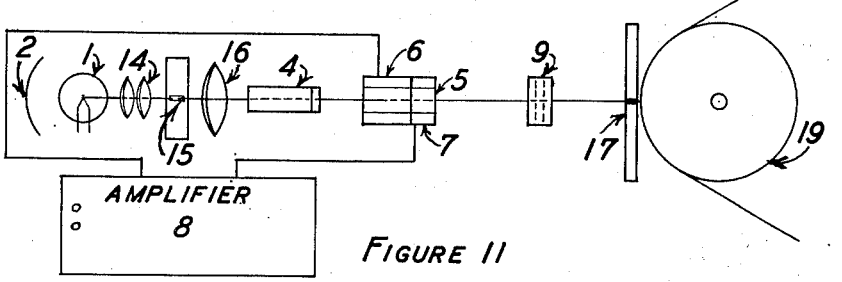
FIGURE 11
DOUGLAS A. ELLIOTT, INVENTOR.
ATTORNEY.

Sept. 3, 1940.                D. A. ELLIOTT                    2,213,307
                     APPARATUS FOR DEFLECTING LIGHT
                      Filed June 26, 1937          4 Sheets-Sheet 4

DOUGLAS A. ELLIOTT, INVENTOR.

BY

ATTORNEY.

Patented Sept. 3, 1940

2,213,307

UNITED STATES PATENT OFFICE 2,213,307

APPARATUS FOR DEFLECTING LIGHT

Douglas A. Elliott, Bronxville, N. Y.

Application June 26, 1937, Serial No. 150,491

17 Claims. (Cl. 88—1)

This invention relates to systems and means whereby a beam of light may be given an instantaneous angular deflection in accordance with applied electrical impulses, and it may be employed to advantage in galvanometers, oscillographs, sound recording, television scanning devices, and other applications which use this principle.

Prior light deflecting devices involved mirrors and other elements of considerable mass, or the beam was deflected by means of a change in the optical properties of a medium through which the light was passed. Devices of this latter type are shown in the patents to Sukumlyn 1,770,535, Skaupy 1,923,891, and the German Patent 352,581 of Skaupy. This present invention may be classified generally with those shown in the foregoing patents. However there will be disclosed a deflecting device which employs a different light transmitting medium, a different optical property of that medium, and which affords a much greater deflection of the light beam for a given applied electrical impulse An object of this invention is, therefore, to provide a light deflecting device which will show a greater response to an applied electrical impulse.

Another object is to provide a light deflecting device which is free from inertia.

Another object is to provide a light deflecting device which is more rugged in construction and simple in maintenance.

A further object is to provide a light deflecting device in which an optical property of a piezo-electric light transmitting medium is altered under applied electrical impulses.

Figure 1:
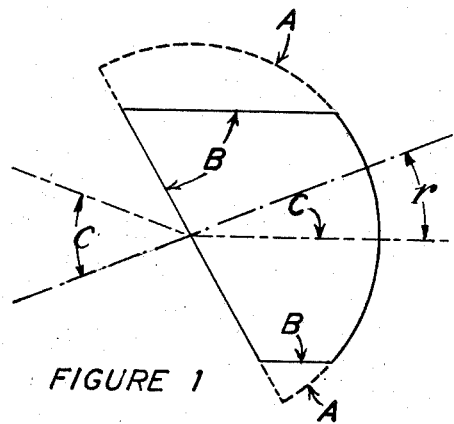
Figure 2:
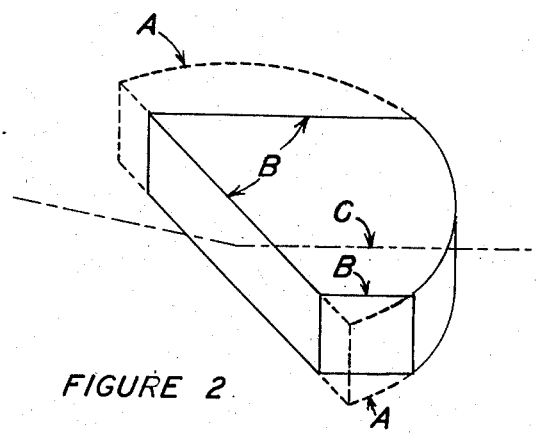
Figure 3:
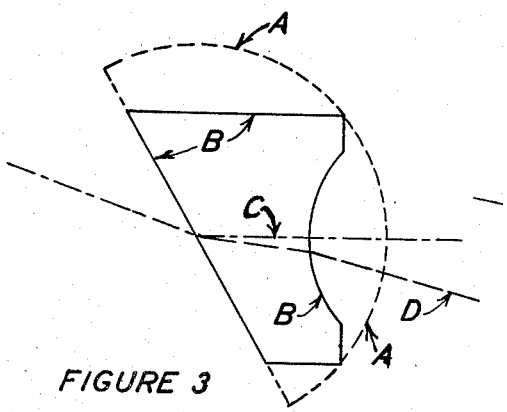
Figure 4:
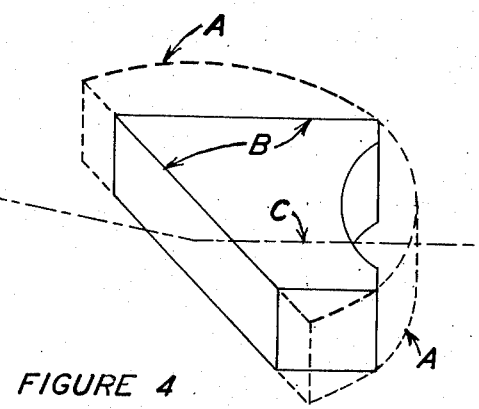
Figure 12:
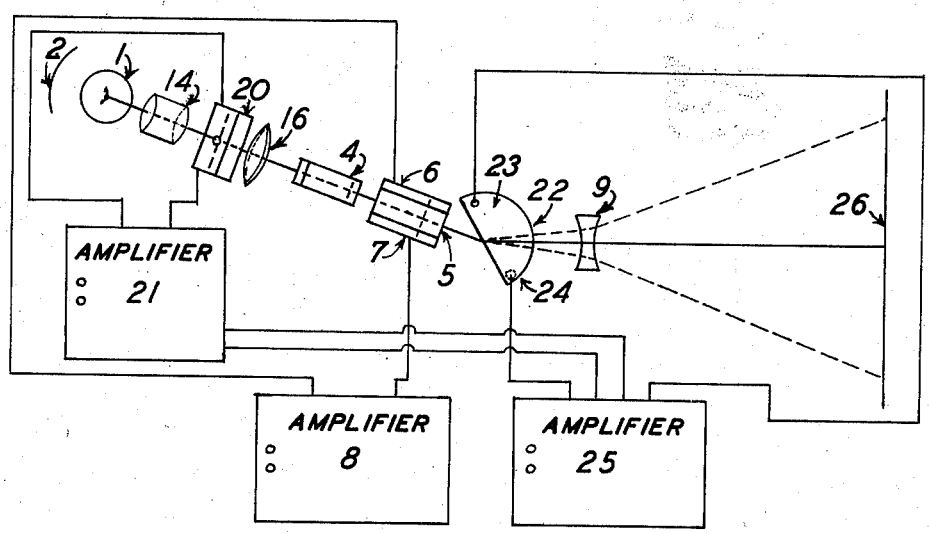
Figure 13:
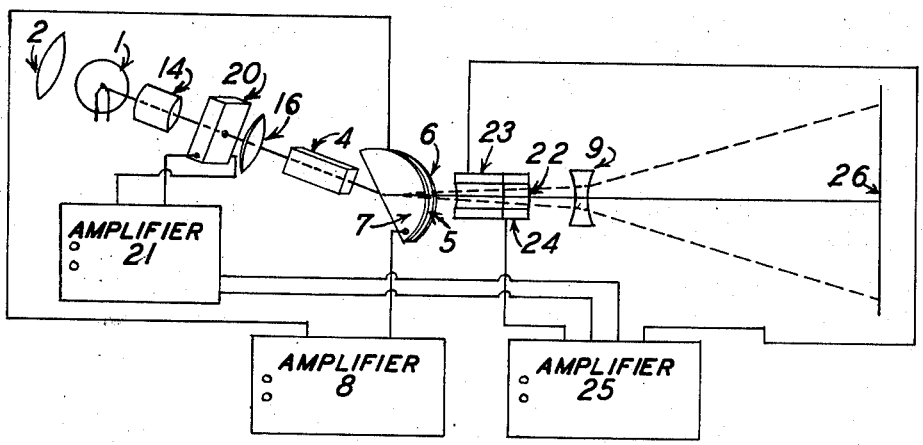

Other objects and advantages will in part be specifically set forth and in part be obvious when the following specification is read in connection with the drawings, in which:

Fig. 1 shows a plan view of a suitable method of cutting the piezo-electric crystal herein employed; Fig. 2 is an isometric view of the method shown in Fig. 1; Fig. 3 is a plan view of an alternative method of cutting a piezo-electric crystal; Fig. 4 is an isometric view of the method shown in Fig. 3; Fig. 5 is a diagrammatic plan view of a galvanometer employing the present invention, and Fig. 6 is a side elevation of the galvanometer shown in diagrammatic form; Fig. 7 is a diagrammatic plan view of a galvanometer employing a piezo-electric crystal cut in accordance with the showing of Figs. 3 and 4; Fig. 8 represents a side elevation of an oscilloscope, and Fig. 9 an oscillograph, employing the piezo-electric light deflector; Figs. 10 and 11 represent a plan view and side elevation, respectively, of a photographic sound recording system based on this present deflector; and Figs. 12 and 13 show a plan view and side elevation, respectively, in diagrammatic form of a television scanning system employing this present piezo-electric light deflecting means.

The basis of this present system of producing an instantaneous angular deflection of a beam of light involves the alteration of the index, or indices, of refraction of media which exhibit the piezo-electric effect, one of which is quartz. It is well known that under the influence of an electric field a piezo-electric crystal will deform. Such crystals have three indices of refraction, one for the extraordinary ray, and two for the ordinary ray. When the crystal is not subject to deformation, the latter two are equal. It has been shown that all three of these indices vary upon the application of an electric field to the crystal, that this variation is instantaneous, and that its magnitude is directly proportional to the applied electric field. Furthermore, the sign of the piezo-electric variation of index of refraction reverses with a reversal of the direction of the applied electric field, so that fields in one direction produce an increase in the index of refraction, while fields in the opposite direction cause a decrease in this index. This fact differentiates the piezo-electric change in index of refraction from the change in index of refraction due to dielectric deformation, which latter is in the same sense irrespective of the direction of the applied electric field. The above mentioned patent to Sukumlyn 1,770,535 employs this principle of di-electric deformation. The patents of Skaupy 1,923,891 and German 352,581 show the use of an isotropic, electrically doubly refracting liquid medium. Under the influence of an electric field media of this nature may exhibit a slightly different index of refraction for the extraordinary ray from that which is exhibited for the ordinary ray. With some isotropic media, the index of refraction increases upon the application of an electric field, while with other isotropic media the index decreases. It will be apparent that the deflection of a light beam in the devices of both Skaupy and Sukumlyn will always be in the same direction whether a positive or negative electrical impulse is applied. Thus when a sine wave of voltage is applied, the light beam will shift in one direction and return to its initial position as the wave passes through zero. For the other half of the cycle, the beam will again shift in the same direction and again return to its initial position. A double frequency effect thus results from alternating applied voltages. In piezo-electric media as employed in this present invention, a sine wave of voltage produces a shift of the beam in one direction, and then an equal shift in the opposite direction as the sign of the applied voltage changes, thus showing twice the deflection obtainable in devices of the type shown by Skaupy and Sukumlyn.

As an example of piezo-electric alteration of index of refraction may be cited the behavior of crystaline quartz under the influence of a varying electric field, wherein, for unit change of electric field equal to one electrostatic unit, the changes in the three indices of refraction based upon the green radiation of mercury are as follows:

Extraordinary ray_____ $\Delta n_e = \pm 2.9 \times 10^{-8}$
Ordinary ray (1)_____ $\Delta n_{o1} = \pm 1.6 \times 10^{-8}$
Ordinary ray (2)_____ $\Delta n_{o2} = \pm 3.9 \times 10^{-8}$ It will be noted that these changes of index are of the same order of magnitude as the piezo-electric constant of the medium.

It is proposed to use this effect to cause an instantaneous angular deflection of a beam or ray of light, which should preferably be monochromatic, in exact accordance with an electric field the strength of which can readily be controlled by received electrical impulses. Where the angle of refraction of the medium is designated by $r$:—

$$r = \sin^{-1} \frac{\sin i}{n}$$

where $i$ is the angle of incidence, and $n$ is the index of refraction for the direction and ray chosen. Obviously any change ($\Delta n$) in the index of refraction will cause a change ($\Delta r$) in the angle of the refracted ray. It is also evident that for a given value of $\Delta n$ the change in $r$ will become greater as the angle of incidence is made to approach 90°. It is, therefore, proposed to use a crystal (such as quartz), or some other transparent medium, exhibiting the piezo-electric effect, fashioned in the fundamental form of a semi-circular plate, having flat parallel faces. The two other boundaries will then be a narrow surface perpendicular to the parallel faces and constructed on a diameter, and also a narrow curved surface perpendicular to the parallel faces and constructed on a semi-circumference of a circle. The parallel faces should preferably be normal to the electrical axis. Either the ordinary or the extraordinary ray may be employed, and may be transmitted through the piezo-electric medium from the center of the boundary surface constituting a diameter, along either the optical axis or an axis perpendicular to both the optical and electrical axes, leaving the medium, at the boundary surface constituting a semi-circumference, normal to this surface irrespective of the angle of refraction. The piezo-electric medium should be so fashioned that the axis along which it is desired to transmit the refracted ray will be parallel to the two parallel faces, and will make an angle of (90°—$r$) with the boundary surface constituting a diameter, when no field is applied to the medium. The angle $r$ should be designed to provide for a relatively large angle of incidence for the incident ray. For a constant angle of incidence a varying electric field applied between the two parallel faces will then vary the index of refraction, and consequently the angle of the refracted ray.

It should further be pointed out that it is not necessary that all of the desired angular change in the direction of the ray or beam of light shall be produced by the piezo-electric medium. Obviously it is possible to magnify a small change so produced many times by means of a lens properly ground in accordance with well known optical principles.

Modifications in the fundamental form of the deflecting medium may of course be made, both for the purpose of eliminating surplus material, and also for the more important purpose of increasing the effectiveness of the device as a light deflector (for a given value of electric field intensity). For convenience and brevity throughout the following descriptions, that portion of the narrow boundary surface constructed on a diameter which is employed in the piezo-electric light deflector, is referred to as the incident edge. In the same manner that portion of the narrow boundary surface constructed on a semi-circumference which is employed either in its fundamental or modified form, is referred to as the emergent edge. The flat parallel boundary surfaces, perpendicular to the direction of the applied electric field, are referred to simply as faces, and the piezo-electric deflecting medium, as a crystal, although it need not be crystaline in composition provided it exhibits the piezo-electric effect, and can be fashioned by some means into the required form. These brief terms are understood to have the same general meaning as defined above for the longer and more accurate terms.

In Figs. 1 and 2 is shown by means of a plan view and an isometric drawing the fundamental method of cutting the crystal. The fundamental semi-circular form is indicated by dotted boundary lines A, while the portion used for the actual deflection of light may be either the entire crystal or some portion of the crystal such as indicated by the solid boundary lines B of the figures. The axis of transmission within the crystal, as defined above, is indicated by dot and dash line C through the crystal, and meets the incident edge at an angle of (90°—$r$) at the point of incidence, which is defined as the point on the incident edge which forms the center of the radius of curvature for the semi-circular emergent edge of the fundamental semi-circular crystal. The direction of the beam or ray of light to be deflected, also indicated by dot and dash line, is made incident to the incident edge of the crystal at the point of incidence, making an angle with the incident edge of (90°—$i$), where $i$ is defined by the equation $i = \sin^{-1}(n \sin r)$ in which $n$ is the index of refraction of the medium from which the light deflector is made, for the plane of polarization and direction of transmission chosen, when no electric field is applied to the medium. In a light deflector cut in the form shown in Figs. 1 and 2, refraction normally takes place at the incident edge only, transmitted light leaving the crystal normal to the emergent edge, irrespective of the angle of refraction at the point of incidence. In such a deflector, having refraction at one edge only, it is possible to reverse the direction of transmission of light through the crystal without in any way altering the operation of the device. When projected light is thus made incident to the "emergent edge," instead of to the incident edge, it is not necessary that the "emergent edge" be given a semi-circular form. It may then be simply a plane surface, parallel to the direction of the applied electric field, to which both the incident ray and the axis of transmission are perpendicular at the same point.

In Figs. 3 and 4 is shown a further modification of the fundamental design of a piezo-electric light deflector. In this instance the emergent edge of the crystal is so designed that refraction of the transmitted beam of light takes place at the emergent edge as well as at the incident edge in such a sense as to still further increase the angle between the axis of transmission and the direction of the deflected beam of light, when an electric field is applied to the deflecting medium. A light deflector designed to produce refraction at the emergent edge as well as at the incident edge, as indicated in Figs. 3 and 4, will produce a greater deflection in a projected beam of light, for the same value of electric field intensity, than can be produced by means of a crystal in which refraction takes place at a single edge (either incident or emergent) only. Refraction in the desired sense will be produced at the emergent edge as indicated by the broken line D in Fig. 3, and will progressively increase in magnitude for a given value of electric field, as the radius of curvature of the emergent edge is increased in magnitude in the positive sense (taking as the positive sense that direction measured from the emergent edge toward and past the point of incidence) from a center of radius at the point of incidence to a center of radius at infinity, and located upon the axis of transmission extended. Still further increase in the refraction at the emergent edge is produced as the center of radius is reduced from the maximum, in the negative sense at minus infinity, down to that small negative value of radius which in operation would produce total reflection within the crystal at the emergent edge. A moderately large negative value of radius of curvature, with the center of radius located on the axis of transmission extended, is employed for the emergent edge of the doubly refractive crystal shown by the solid lines of Figs. 3 and 4 in both the plan view and the isometric drawing. It must be pointed out that where the emergent edge is a sector of a circle having its center of radius on the axis of transmission of the crystal, extended in either a positive or negative direction, in accordance with the principles outlined above, distortion in the angle of divergence of the beam of transmitted light will take place at the emergent edge. This is due to the fact that, while the angle between the direction of transmission of a ray of light through the crystal and the axis of transmission is virtually equal either side of this axis for equal opposite values of applied electric field, rays of equal and opposite angular deflection emerge from the crystal with different indices of refraction, and are consequently refracted upon emergence with different angles. It is this fact which may result in objectionable distortion. This distortion may be corrected by a slight alteration in the curvature of the emergent edge.

The principle of piezo-electric deflection of a ray or beam of light as disclosed above, has numerous commercial applications. Of these the most fundamental is the electrostatic galvanometer, a plan of which, in its elementary form, is shown in Fig. 5. Here 1 represents a light source, preferably monochromatic, having behind it a reflector 2, to concentrate the light upon a vertical slit or pin-hole 3, which thus becomes a new virtual light source. Light from the slit 3 passes through a polarizing medium 4, and is caused to be incident to the piezo-electric deflector plate or prism 5 on its plane edge (incident edge) at the point of incidence so that the bar of light from the slit 3 shall be perpendicular to the faces of the crystal. Element 5 is a deflecting plate or prism fashioned from a medium exhibiting the piezo-electric effect either in the fundamental form, or one of the modifications thereof, described in detail above, and illustrated in Figs. 1 to 4. Elements 6 and 7 are the two plates of a condenser and are placed one against each of the two parallel faces of the crystal 5, respectively, so that an electrostatic field may be impressed upon the crystal. The condenser plates 6 and 7 are connected by wires to vacuum tube amplifier 8. The purpose of this amplifier is to amplify any electrical wave form which it is desired to impress upon the piezo-electric deflector plate or prism 5. When no charge is impressed on the condenser plates 6 and 7, the incident beam of light is refracted at the point of incidence in accordance with the normal index of refraction of the medium of which element 5 is made, (for the plane of polarization and axis of transmission chosen), and passes through the crystal, through the diverging lens 9, and is projected upon the midpoint of the scale 10. When a given electric field is applied to condenser plates 6 and 7 in one direction, the resultant change in the index of refraction causes the refracted ray of light to pass through the crystal at an angle to its original direction, which angle is magnified by the diverging lens 9, causing the ray of light to be projected upon the scale 10, near one end of the scale (as shown by one of the dotted lines in Fig. 5). When the field between the condenser plates is reversed and reaches an equal magnitude in the opposite direction, this effect is reversed, and the ray of light is projected upon the scale near its opposite end as shown by the other of the dotted lines in Fig. 1.

Fig. 6 is an elevation of the apparatus shown in plan in Fig. 5 and like parts bear like reference numerals.

Fig. 7 is a plan of the same apparatus as shown in Figs. 5 and 6 and bears like reference numerals. The difference in this case is the employment of a crystal deflecting plate or prism, as element 5, which is fashioned to produce refraction at both the incident and emergent edges, in the manner described above and illustrated in Figs. 3 and 4, in place of the singly refractive element 5 shown in Figs. 5 and 6. Fig. 7 indicates, by the greater divergence of the dotted lines, the increased sensitivity which is obtained in this case.

The advantage of this device over previous electrostatic galvanometers lies in the fact that, due to its lack of inertia effects, it will accurately follow high frequency, or transient, voltage variations impressed upon the condenser plates. Furthermore, due to its mass-less action, the instrument is "dead-beat", and the beam of light will come to rest instantaneously at that point on the scale corresponding to any fixed positive or negative voltage within the range of the instrument which may be impressed upon the condenser plates.

By providing a time axis at right angles to that about which the piezo-electric deflector plate oscillates the projected beam or ray of light, this device may be employed as a high-frequency oscilloscope or oscillograph. In Fig. 8 are shown the changes necessary to make this device operate as an oscilloscope. For the scale 10 of Figs. 5 to 7 is substituted a mirror drum 11 which may be rotated about its axis (perpendicular to the plane of the drawing) at a uniform speed, having mounted around its surface and parallel to its axis a number of mirrors set at equal angles to each other so as to reflect the projected beam of light upon the translucent viewing screen 12. The view shown is the elevation of the equipment, all other elements of which are the same, and bear the same reference numerals as in Figs. 5 to 7.

Fig. 9 illustrates the construction necessary to employ this device as an oscillograph. For the scale 10 of Figs. 5 to 7 is substituted a drum 13 which may be rotated about its axis (perpendicular to the plane of the drawing) at a uniform speed, having mounted upon its circumference photographic film, and contained in a light tight container 13', so arranged that the film may be exposed to the action of the projected light during one revolution of the drum. The view shown is the elevation of the equipment, all other elements of which are the same, and bear the same reference numerals as in Figs. 5 to 7.

A further application of the piezo-electric deflector plate or prism may be made to the continuous recording of sound, or any other vibration which is capable of being converted into an electric field of varying strength and direction, upon motion picture or other continuously traveling film. Such an application is shown in plan in Fig. 10 and in elevation in Fig. 11, in both of which the same elements bear corresponding numerals. Light, preferably monochromatic, from a source 1, having behind it a reflector 2, is concentrated by means of a condensing lens 14 upon a horizontal slit 15, which is thus caused to be a new virtual light source. Light from the slit passes through the focusing lens 16, and polarizing medium 4, and is caused to be incident to the incident edge of the deflecting plate or prism 5, at the correct incident angle, as earlier defined, and in such a manner that the beam lies in a plane containing the axis of transmission of the crystal and parallel to the two flat parallel faces of the crystal. One end of this horizontal incident beam should be made incident to the incident edge of the piezo-electric deflector plate exactly at the previously described point of incidence. Condenser plates 6 and 7 are placed against the two parallel faces of the deflector plate 5, respectively, and are electrically connected to amplifier 8, as in previous applications of this device. Motion picture film 18 is passed over a drum 19, which revolves with a uniform angular velocity about an axis perpendicular to the plane of Fig. 11, and behind an aperture plate 17, in which is a narrow horizontal slit in the plane containing the projected light beam and the axis of the drum 19. The length of this aperture in the horizontal direction is just sufficient to cover the width of the sound track on the film, and is located just in front of the position of the sound track. The elements of this device are so arranged that that end of the incident beam of light which is incident to the deflector plate at the point of incidence shall be so refracted and transmitted through the deflector plate 5, and the diverging lens 9, that it shall be incident to the aperture plate 17, exactly at one end of the aperture under the desired voltage conditions of the condenser plates 6 and 7. These conditions may be either (a) with no voltage existing on the condenser plates, or (b) with a slight uni-directional biasing voltage applied to the condenser plates, upon either of which conditions the variable voltage to be recorded may be superimposed. When the voltage between the condenser plates is varied in that sense which causes the refracted beam of light to be deflected so as to pass through the aperture in the aperture plate the sound track on the film will be photographically exposed. The frequency with which these variations take place will determine the frequency of the recorded sound, and the magnitude of the deflections will determine the amplitude, or volume level, of the recorded sound. The combination of elements shown in Figs. 10 and 11 may be so operated in duplicate as to provide for "push-pull" recording.

The piezo-electric deflector plate or prism, operated by the application of an electric field, finds still further application as a scanning means in a system for the projection upon a screen of received television images. The mode of operation of this device and of the system of which it forms the basis is shown in plan view in Fig. 12, and in elevation in Fig. 13, in both of which the same elements bear corresponding numbers. Illumination is provided by a light source 1 having behind it a reflector 2. Light, preferably monochromatic, from this source is concentrated by means of condensing lens 14 and passes through a light valve 20. The purpose of this light valve, which may be of any appropriate type, is to control the intensity of illumination of successive elements of the picture projected upon the screen, in accordance with the corresponding received electrical impulses, which are amplified by means of amplifier 21 associated with, and electrically connected to, the light valve. If a light source of sufficient intensity, and at the same time capable of having its intensity adequately modulated by means of received signals, is available, the light valve 20 may be dispensed with, and the amplifier 21 employed in conjunction with such a light source so as to control the intensity of the emitted light. The beam of light which has passed through the light valve is then passed through focusing lens 16, and a polarizing medium 4, and is caused to be incident to the incident edge of the piezo-electric deflector plate or prism 5, at the point of incidence and at an angle (90°—i) to the incident edge, in accordance with the requirements already set forth in the description of the piezo-electric deflector plate. Condenser plates 6 and 7, mounted one against each of the flat parallel faces of the deflector plate, and electrically connected to amplifier 8, have impressed upon them through amplifier 8 a voltage varying in accordance with the picture repetition or vertical scanning frequency, of such wave form as may be desired, and synchronized with the picture repetition frequency of the transmitter by means of received electrical impulses applied through amplifier 8. The axis along which the varying electric field is applied by means of condenser plates 6 and 7 should lie in the horizontal plane, and the axis of transmission in the plane in which it is desired to project the picture.

To provide for scanning in a plane at right angles to that in which deflector plate 5 causes the picture to be scanned, a second deflector plate 22 is mounted so that the axis of its applied electric field is at right angles to the axis of the electric field applied to deflector plate 5, and with its axis of transmission lying in the plane, at right angles to its applied electric field, in which it is desired to project the picture. The plane in which it is desired to project the picture may be defined as: That plane which contains a line from the point of incidence of deflector plate 22 to some reference point on the surface of the screen upon which it is desired to view the picture, and which meets the surface of that screen in a horizontal line. Deflecting plate 22 should be so mounted that the axis of transmission of deflecting plate 5, when extended, meets the incident edge of plate 22 at its point of incidence and at an angle of (90°—i) to the incident edge of plate 22, in accordance with the requirements already set forth in the description of the piezo-electric deflector plate. To avoid distortion at the incident edge of plate 22 this edge should be given a slight curvature in the plane in which deflector plate 5 deflects the transmitted light beam. The center of radius of this curvature is the apparent point of refraction in the deflector plate 5. When, however, a crystal having refraction at one edge only is employed at 5 the apparent point of refraction and the actual point of refraction will coincide. Since the plane of this curvature does not intersect the plane of the incident edge at 90°, the actual curvature given to the incident edge as viewed looking along the incident edge from one end toward the other, will be elliptical in form. A similar curvature, with its center of radius at the same point, should be given to the emergent edge of deflector plate 22 to avoid distortion at this point.

Condenser plate 23 and 24 are mounted one against each of the opposite parallel faces of deflector plate 22, and are electrically connected to amplifier 25. By means of this amplifier a variable voltage of the desired wave form is impressed upon deflector plate 22, causing the light beam transmitted therethrough to be deflected horizontally in accordance with the desired horizontal scanning frequency, as determined by received electrical impulses impressed upon amplifier 25. This amplifier may be connected back electrically to amplifier 21 in such a manner as to provide for extinguishing the light beam, by means of light valve 20, during the return trace of the horizontal scanning operation.

The transmitted light beam, after having had vertical and horizontal deflections impressed upon it, by means of piezo-electric crystal deflector plates 5 and 22, is focused on the screen 26 through diverging lens 9. This lens should be so designed optically as to magnify by an equal factor the deflections produced by deflector plates 5 and 22 respectively.

Centering of the picture upon the screen may be accomplished by applying a moderate biasing voltage to either or both crystal deflector plates 5 and 22, through their associated amplifiers, or otherwise, and varying these voltages as required to center the picture. It is evident that the entire system may be rotated through any desired angle, as for example 90°, so as to provide for scanning in other than the horizontal plane. It should be pointed out that it is desirable in the case of crystal deflector plate 5, and important in the case of crystal deflector plate 22, that the planes in which these plates respectively deflect light transmitted through them, should lie midway between the two flat parallel faces of these respective plates. While the functions of these two piezo-electric deflector plates naturally may be reversed, it is advisable that that deflector plate which is the nearer to the light source in the system be employed to produce the lesser of the two desired deflections, which, in general, is the picture repetition frequency, and not the scanning frequency.

It will be obvious that in all of the above applications light deflectors of the type shown in Figs. 3 and 4, instead of those in Figs. 1 and 2, may be used in Figs. 5, 6, 8, 9, 10, 11, 12 and 13.

Also it will be obvious that many changes and modifications may be made by anyone expert in the art without departing from the spirit or the scope of the invention as set forth in the following claims:

1. In a light deflecting apparatus, a piezo-electric substance fashioned in the fundamental form of a semi-circular plate with flat parallel faces and having a surface perpendicular to said parallel faces constructed along a diameter of said semi-circle, and a curved surface perpendicular to said parallel faces constructed along the circumference of said semi-circle.

2. In a light deflecting apparatus, a piezo-electric substance fashioned in the fundamental form of a semi-circular plate with flat parallel faces and having a surface perpendicular to said parallel faces constructed along a diameter of said semi-circle, a curved surface perpendicular to said parallel faces constructed along the circumference of said semi-circle, and an arc in said surface re-entrant toward said first named surface.

3. In a light deflecting apparatus, a piezo-electric substance having parallel faces, an incident edge perpendicular to said faces and constructed along the diameter of a semi-circle, an emergent edge perpendicular to said faces and constructed along the circumference of said semi-circle, a light source, and means for directing a beam of light from said source upon said incident edge.

4. In a light deflecting apparatus, a piezo-electric substance having parallel faces, an incident edge perpendicular to said faces and constructed along the diameter of a semi-circle, an emergent edge perpendicular to said faces and constructed along the circumference of said semi-circle, an arc in said emergent edge re-entrant toward said incident edge, a light source, and means for directing a beam of light from said source upon said incident edge.

5. In a light deflecting apparatus, a piezo-electric substance having parallel faces, an incident edge perpendicular to said faces and constructed along the diameter of a semi-circle, an emergent edge perpendicular to said faces and constructed along the circumference of said semi-circle, a light source, and means for directing a beam of monochromatic light from said source upon said incident edge.

6. In a light deflecting apparatus, a piezo-electric substance having parallel faces, an incident edge perpendicular to said faces and constructed along the diameter of a semi-circle, an emergent edge perpendicular to said faces and constructed along the circumference of said semi-circle, an arc in said emergent edge re-entrant toward said incident edge, a light source, and means for directing a beam of monochromatic light from said source upon said incident edge.

7. In a light deflecting apparatus, a piezo-electric substance having parallel faces, an incident edge perpendicular to said faces and constructed along the diameter of a semi-circle, an emergent edge perpendicular to said faces and constructed along the circumstance of said semi-circle, a light source, means for directing a beam of light from said source upon said incident edge, an electrode mounted on each of said parallel faces, and means for creating a difference of electrical potential between said electrodes.

8. In an apparatus for angularly deflecting a beam of light, a substance the index of refraction of which is changeable in accordance with the application of a variable electrical force thereto having two substantially plane parallel faces, a first surface portion substantially perpendicular to said faces and forming an acute angle with respect to a line through said substance which is substantially parallel to said faces, and a second surface portion opposite said first surface portion substantially perpendicular to said faces and having an arcuate contour which is substantially symmetrical with respect to both sides of said line, whereby a beam of light directed against said first surface portion in a manner to normally pass along said line emerges from said second surface portion deflected angularly with respect to the direction of the directed beam in correspondence with variations in an electrical force applied to said substance.

9. In an apparatus for angularly deflecting a beam of light, a substance the index of refraction of which is changeable in accordance with the application of a variable electrical force thereto having two substantially parallel faces, a first surface portion extending between said faces and forming an acute angle with respect to a line through said substance and lying between said faces, and a second surface portion opposite said first surface portion having an arcuate contour the axis of curvature of which is substantially on said line, whereby a beam of light directed against said first surface portion in a manner to normally pass along said line is variably refracted in said substance and emerges from said second surface portion deflected angularly with respect to the direction of the directed beam in correspondence with variations in an electrical force applied to said substance.

10. In an apparatus for angularly deflecting a beam of light, a substance the index of refraction of which is changeable in accordance with the application of a variable electrical force thereto having two substantially parallel faces, a first surface portion substantially perpendicular to said faces and forming an acute angle with respect to a line through said substance which is substantially parallel to said faces, and a second surface portion opposite said first surface portion having a circular contour which is substantially symmetrical with respect to both sides of said line, whereby a beam of light directed against said first surface portion in a manner to normally pass along said line emerges from said second surface portion deflected angularly with respect to the direction of the directed beam in correspondence with variations in an electrical force applied to said substance.

11. In an apparatus for angularly deflecting a beam of light, a piezo-electric substance having two substantially plane parallel faces, a first surface portion extending between said faces and forming an acute angle with respect to a line through said substance which is substantially parallel to said faces, and a second surface portion opposite said first surface portion extending between said faces and having a circular contour the axis of curvature of which is substantially on said line at a position outside said substance to form a curvature reentrant with respect to said first surface portion, whereby a beam directed on said first surface portion to normally pass along said line emerges from said second surface portion to the surrounding medium angularly deflected with respect to the direction of the directed beam substantially proportional to the magnitude and sense of a variable electrical force applied across the said faces.

12. In an apparatus for angularly deflecting a beam of light, a piezo-electric substance having apposed electrode faces, a first surface portion substantially perpendicular to said faces and forming an acute angle with respect to a line extending through said substance and lying between said faces, and a second surface portion opposite said surface portion extending between said faces and having a circular contour the axis of curvature of which lies at the intersection of said line and said first surface portion, whereby a beam of light directed against said first surface portion in a manner to normally pass along said line emerges from said second surface portion deflected angularly with respect to the direction of the directed beam in correspondence with variations in an electrical force applied to said substance across said electrode faces.

13. A system for angularly deflecting a beam of light comprising a substance the index of refraction of which is changeable in accordance with the application of a variable electrical force thereto, said substance having apposed electrode faces and a first surface portion extending between said faces, means for directing the beam upon said first surface portion to enter said substance at an acute angle of incidence which causes refraction of the beam in a manner to normally pass it along a predetermined line of transmission which lies between said faces, means for applying a variable electrical force across said electrode faces and substantially uniformly through said substance to variably refract the beam within said substance with respect to said line, the emergent surface of said substance extending between said faces opposite said first surface portion and symmetrically proportioned with respect to both sides of said line, whereby the beam emerges from said substance angularly deflected with respect to the direction of the directed beam in correspondence with the magnitude and sense of said variable electrical force.

14. A system for angularly deflecting a beam of light comprising a substance the index of refraction of which is changeable in accordance with the application of a variable electrical force thereto, said substance having substantially plane parallel faces and a first surface portion substantially perpendicular to said faces, means for directing the beam upon said first surface portion at the acute angle of incidence which causes refraction of the beam upon entering said substance in a manner to normally pass along a predetermined line of transmission which is substantially parallel to said faces, means for applying a variable electrical force to said substance, the emergent surface of said substance being substantially perpendicular to said faces and symmetrically proportioned with respect to both sides of said line, whereby the beam emerges from said substance angularly deflected with respect to the direction of the directed beam substantially proportional to variations of said electrical force.

15. A system for angularly deflecting a beam of light comprising a substance the index of refraction of which is changeable in accordance with the application of a variable electrical force thereto, said substance having substantially parallel faces and a first surface portion substantially perpendicular to said faces, means for directing the beam upon said first surface portion at the acute angle of incidence which causes refraction of the beam upon entering said substance in a manner to normally pass along a predetermined line of transmission which is substantially parallel to said faces, means for applying a variable electrical force to said substance, the emergent surface of said substance having an arcute contour symmetrically proportioned with respect to both sides of said line, whereby the beam emerges from said substance angularly deflected with respect to the direction of the directed beam in correspondence with the magnitude and sense of said variable electrical force.

16. A system for angularly deflecting a beam of light comprising a substance the index of refraction of which is changeable in accordance with the application of a variable electrical force thereto, said substance having substantially parallel faces and a first surface portion extending between said faces, means for directing the beam upon said first surface portion at the acute angle of incidence which causes refraction of the beam upon entering said substance in a manner to normally pass along a predetermined line of transmission which is substantially parallel to said faces, means for applying a variable electrical force substantially uniformly through said substance, the emergent surface of said substance having a circular contour symmetrically proportioned with respect to both sides of said line, whereby the beam emerges from said substance angularly deflected with respect to the direction of the directed beam substantially proportional to variations of said electrical force.

17. A system for angularly deflecting a beam of light comprising a piezo-electric substance, said substance having substantially plane parallel faces and a first surface portion substantially perpendicular to said faces, means for directing the beam upon said first surface portion at the acute angle of incidence which causes refraction of the beam upon entering said substance in a manner to normally pass along a predetermined line of transmission which is substantially parallel to said faces, means for applying a variable electrical force to said substance, the emergent surface of said substance being substantially perpendicular to said faces and having an arcuate contour symmetrically proportioned with respect to both sides of said line and the axis of curvature of which is substantially on said line extended from said substance beyond said second surface portion to form a curvature reentrant with respect to said first surface portion, whereby the beam emerges from said substance angularly deflected with respect to the direction of the directed beam in correspondence with the magnitude and sense of said variable electrical force.

DOUGLAS A. ELLIOTT.